(12) United States Patent
Liu (10) Patent No.: US 7,808,756 B2
(45) Date of Patent: Oct. 5, 2010

(54) CIRCUIT AND METHOD FOR SHORT CIRCUIT PROTECTION

(75) Inventor: Jing-Meng Liu, Jubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 373 days.

(21) Appl. No.: 12/012,691

(22) Filed: Feb. 6, 2008

(65) Prior Publication Data

US 2008/0192397 A1      Aug. 14, 2008

(30) Foreign Application Priority Data

Feb. 8, 2007      (TW) ............................... 96104629 A (51) Int. Cl.
*H02H 3/00*      (2006.01)
*H02H 9/08*      (2006.01)
(52) U.S. Cl. ........................................ 361/86; 361/93.9
(58) Field of Classification Search .................... 361/86, 361/93.9
See application file for complete search history.

(56) References Cited

U.S. PATENT DOCUMENTS

| | | | | | |
|---|---|---|---|---|---|
| 4,429,339 | A | * | 1/1984 | Jaeschke et al. | 361/93.7 |
| 4,751,408 | A | * | 6/1988 | Rambert | 327/436 |
| 4,893,211 | A | * | 1/1990 | Bynum et al. | 361/18 |
| 5,418,673 | A | * | 5/1995 | Wong | 361/18 |
| 6,534,833 | B1 | * | 3/2003 | Duvvury et al. | 257/355 |
| 6,664,842 | B1 | * | 12/2003 | Pobanz | 327/436 |
| 2005/0179463 | A1 | * | 8/2005 | Kasuya et al. | 326/83 |

* cited by examiner

*Primary Examiner*—Jared Fureman
*Assistant Examiner*—Lucy Thomas
(74) *Attorney, Agent, or Firm*—Tung & Associates (57) ABSTRACT

The present invention discloses a short circuit protection circuit comprising: a first input terminal; a second input terminal; an output terminal; at least two transistors including a first and a second transistors connected in series with each other and electrically connected between the first input terminal and the output terminal; and a voltage source circuit electrically connected with the first input terminal, the second input terminal, the output terminal, and the gates of the first and second transistors.

17 Claims, 7 Drawing Sheets

CIRCUIT AND METHOD FOR SHORT CIRCUIT PROTECTION

FIELD OF INVENTION

The present invention relates to a circuit and a method for short circuit protection, and in particular to a short circuit protection circuit to be electrically connected to an output terminal of a boost converter circuit, which is made of relatively low voltage devices but capable of sustaining relatively high voltage, and a corresponding short circuit protection method.

BACKGROUND OF THE INVENTION

Figure 1:
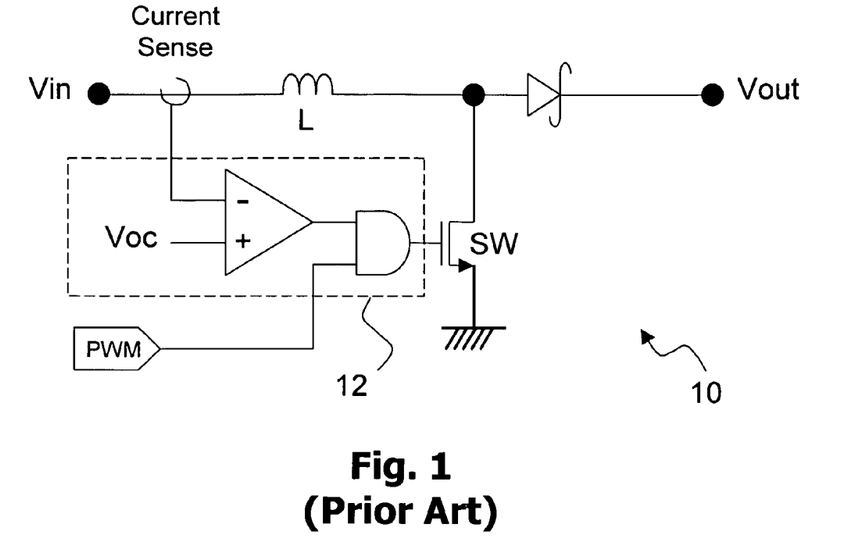
FIG. 1 is a schematic diagram showing a conventional boost converter circuit.
Figure 2:
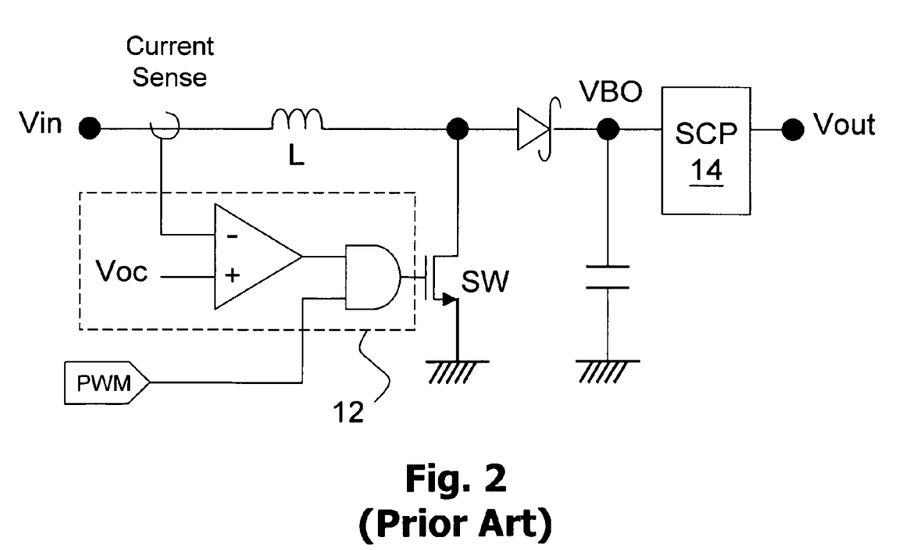
FIG. 2 is a schematic diagram showing how a short circuit protection circuit is provided to the output terminal of a conventional boost converter circuit.

A boost converter circuit converts a relatively low input voltage to a relatively high output voltage and supplies it to a load. FIG. 1 shows a conventional boost converter circuit 10, which converts a relatively low input voltage Vin to a relatively high output voltage and supplies it to an output terminal Vout. In the circuit shown in FIG. 1, if the output terminal of the boost converter circuit 10 is shorted to ground, although the switch SW can be turned OFF by the control circuit 12, the path from the input terminal Vin to the output terminal Vout is still conductive; therefore, the inductor L still keeps storing energy, and there may be other damages caused by current continuously flowing on the path. Hence as shown in FIG. 2, preferably, a short circuit protection circuit is provided between the output VBO of the boost converter circuit 10 and the output terminal Vout, for cutting off the conduction between the node VBO and the output terminal Vout when the output terminal of the boost converter circuit 10 is shorted to ground.

Figure 3:
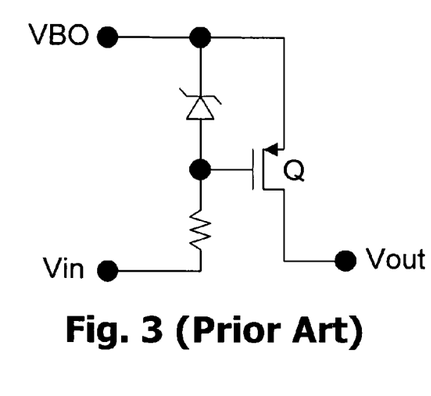
FIGS. 3-7 are schematic diagrams showing conventional short circuit protection circuits.

FIGS. 3-7 show several conventional short circuit protection circuits 14. Referring to FIG. 3, in normal operation, the output voltage VBO is higher than the input voltage Vin, the gate to source voltage Vgs of the PMOS transistor Q being negative, so the PMOS transistor Q is completely ON, and the voltage at the output terminal Vout is substantially equal to the output voltage VBO of the boost converter circuit 10. When the output terminal Vout is shorted to ground, the boost converter circuit 10 does not operate, and the output voltage VBO of the boost converter circuit 10 drops. When the output voltage VBO is equal to the input voltage Vin, the gate to source voltage Vgs of the PMOS transistor Q becomes zero, and therefore the PMOS transistor Q turns OFF, cutting off the conduction between the node VBO and the output terminal Vout, to thereby provide the short circuit protection effect.

Figure 4:
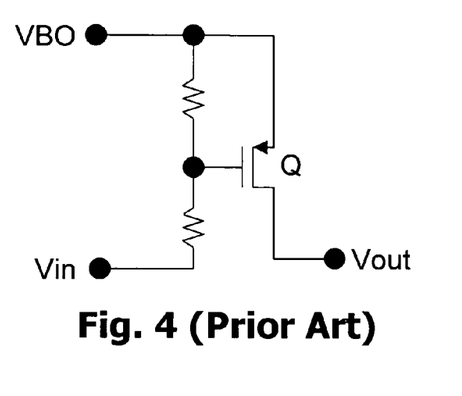
Figure 5:
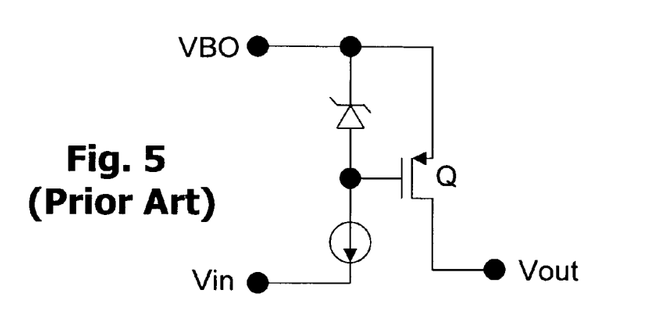
Figure 6:
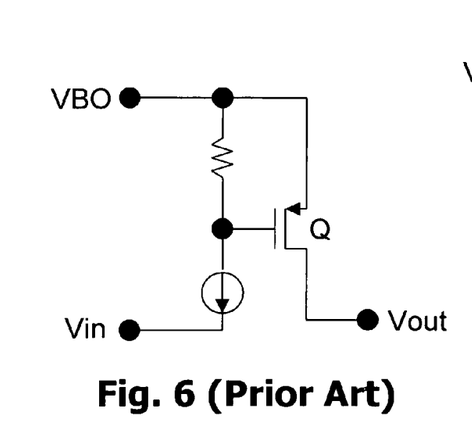
Figure 7:
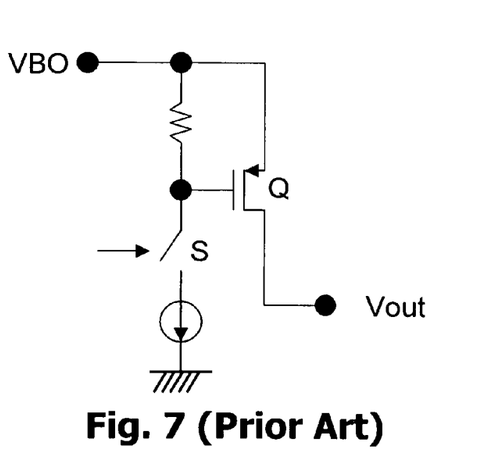

The operation of the circuits shown in FIGS. 4-6 is similar to that of FIG. 3. As to the circuit of FIG. 7, in normal operation, the switch S is ON; when the output terminal Vout is shorted to ground, a control signal is generated (for example from the comparator shown in FIGS. 1 and 2) to turn OFF the switch S, so that the gate to source voltage Vgs of the PMOS transistor Q becomes zero. In this manner, it also achieves the short circuit protection effect as above.

The conventional short circuit protection circuits shown in FIGS. 3-7 do provide the short circuit protection effect as required, but they have the following disadvantages. Because the circuit 10 is a boost converter, the output voltage VBO is a high voltage, and thus at the initial instant period when the output terminal Vout is shorted to ground, the source to drain voltage difference of the transistor Q is very large. For this reason, the transistor Q has to be made of a costly high voltage device capable of sustaining relatively high voltage, and it also increases the complexity of the corresponding wafer manufacturing process.

Therefore, a short circuit protection circuit made of relatively low voltage devices but capable of sustaining relatively high voltage is desired.

SUMMARY

In view of the foregoing, it is an objective of the present invention to provide a short circuit protection circuit, to meet the aforementioned desire.

Another objective of the present invention to provide a short circuit protection method.

In accordance with the foregoing and other objectives of the present invention, and from one aspect of the present invention, a short circuit protection circuit comprises: a first input terminal; a second input terminal; an output terminal; at least two transistors including a first and a second transistors connected in series with each other and electrically connected between the first input terminal and the output terminal; and a voltage source circuit electrically connected with the first input terminal, the second input terminal, the output terminal, and the gates of the first and second transistors.

Preferably, when the output terminal is shorted to ground, the voltage source circuit controls the gates of the first and second transistors such that the first and second transistors share the voltage difference between the first input terminal and the output terminal. In addition, when the first input terminal is below a predetermined voltage, the voltage source circuit controls the gates of the first and second transistors to cut off the conduction between the first input terminal and the output terminal.

Preferably, the voltage source circuit includes three voltage sources: a first voltage source electrically connected between the first input terminal and the gate of the first transistor, a second voltage source electrically connected between the gate of the first transistor and the gate of the second transistor, and a third voltage source electrically connected between the gate of the second transistor and the second input terminal. More preferably, the second voltage source is a variable voltage source.

From another aspect of the present invention, a short circuit protection method, comprising the steps of: providing at least two transistors including a first and a second transistors connected in series with each other and electrically connected between an input terminal and an output terminal; when the output terminal is operating normally, controlling the voltages at the gates of the first and second transistors to be substantially equal with each other; and when the output terminal is shorted to ground, controlling the first and second transistors such that the first and second transistors share the voltage difference between the input terminal and the output terminal.

It is to be understood that both the foregoing general description and the following detailed description are provided as examples, for illustration rather than limiting the scope of the invention.

BRIEF DESCRIPTION OF THE DRAWINGS

These and other features, aspects, and advantages of the present invention will become better understood with regard to the following description, appended claims, and accompanying drawings.

DESCRIPTION OF THE PREFERRED EMBODIMENTS

Figure 8:
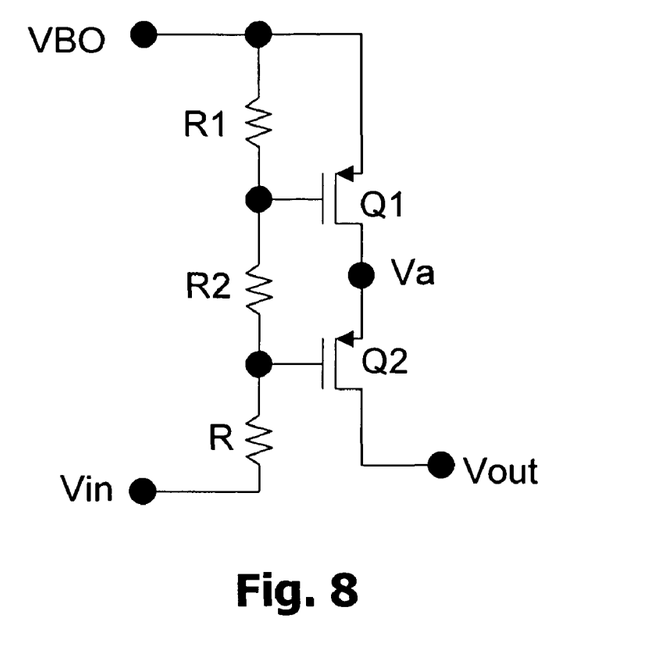
FIG. 8 is a schematic diagram showing a short circuit protection circuit according to an embodiment of the present invention.

FIG. 8 is a schematic circuit diagram illustrating a first embodiment of the present invention. As shown in the figure, according to the present embodiment, two transistors Q1 and Q2 are provided. At the initial instant period when the output terminal Vout is shorted to ground, the voltage VBO is still much higher than the input voltage Vin, so the resistors R1, R2 and R form a voltage divider circuit, and the gate to source voltages Vgs1 and Vgs2 of the transistors Q1 and Q2 correspond to the voltages across the resistors R1 and R2, respectively. Assuming R1=R2 for simplicity (not necessarily required), and that the transistors Q1 and Q2 have matching characteristics, the transistors Q1 and Q2 evenly share the voltage VBO. In comparison with the conventional circuits shown in FIGS. 3-7, because the transistors Q1 and Q2 evenly share the voltage VBO, they can be made of devices having a lower voltage specification than that of the transistor Q. In general, the cost of two transistors with a lower voltage specification is still lower than the cost of one transistor with a higher voltage specification, and furthermore the process integration for low voltage devices is easier. The resistors R1, R2 and R in this embodiment may be replaced by other voltage sources or devices providing similar effects, such as zener diode, current source, and the like, as referring to FIGS. 3-7.

The embodiment of FIG. 8 can be further improved with respect to its power transmission efficiency. More specifically, assuming R1=R2 for simplicity, if both transistors Q1 and Q2 are completely turned ON, it means VBO=Va=Vout. However, because of the voltages across the resistors R1 and R2, the gate to source voltage Vgs2 of the transistor Q2 is twice the gate to source voltage Vgs1 of the transistor Q1; thus, unless the transistors Q1 and Q2 have different device characteristics, they can not both be completely turned ON. In practice, the two transistors are devices with the same characteristics, and therefore the transistor Q1 can only be turned half-ON, forming a relatively higher internal resistance. As a result, Vout<VBO, that is, the voltage VBO can not be fully transmitted to the output terminal Vout, and the power transmission efficiency is not optimum.

Figure 9:
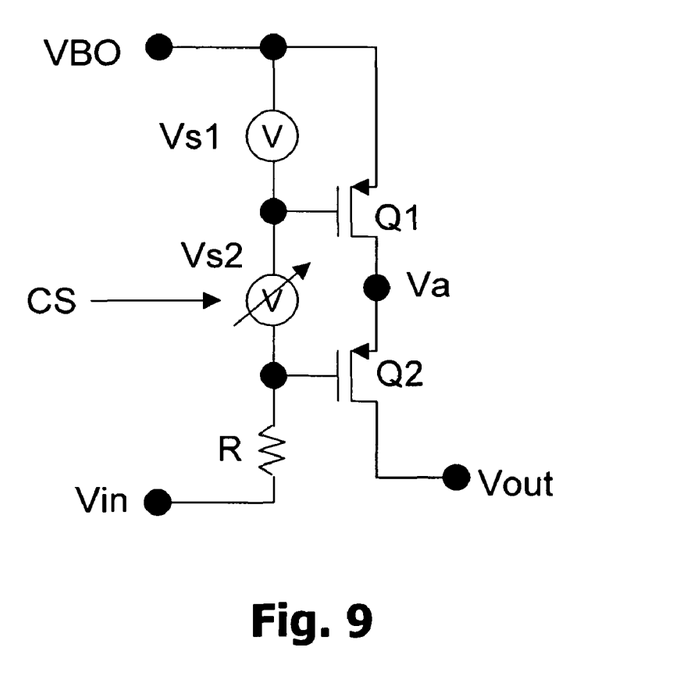
FIGS. 9 and 10 are schematic diagrams showing two short circuit protection circuits according to two embodiments of the present invention.

The embodiment of FIG. 8 can be further improved according to the present invention. Referring to FIG. 9 which shows a more preferred embodiment, in which a variable voltage source Vs2 is provided between the gates of the transistors Q1 and Q2. The variable voltage source Vs2 has a voltage value which is controlled by a control signal CS. The control signal CS for example may be the output from the comparator shown in FIGS. 1 and 2, or other signals (to be explained later).

The circuit of FIG. 9 operates as follows. In normal operation, the voltage value of the variable voltage source Vs2 is zero, so that there is no voltage difference between the gates of the transistors Q1 and Q2. When the voltage across the voltage source Vs1 completely turns ON the transistor Q2, the transistor Q1 is also completely turned ON, so that there is no voltage difference among the voltages VBO, Va and Vout. As a result, the voltage VBO is fully transmitted to the output terminal Vout.

When the output terminal Vout is shorted to ground, the voltage value of the variable voltage source Vs2 is controlled to be higher than zero, so that the transistors Q1 and Q2 share the voltage VBO (which is very high at the instant period when the output terminal Vout is just shorted to ground). In one embodiment, the voltage value of the variable voltage source Vs2 is substantially equal to the voltage value of the voltage source Vs1, thus, according to the principle explained in the above with reference to FIG. 8, the transistors Q1 and Q2 evenly share the voltage VBO. Thereafter, the voltage VBO gradually decreases to the level of the voltage Vin, and at this moment the gate to source voltage Vgs1 of the transistor Q1 becomes zero, so that the transistor Q1 is turned OFF, to cut off the conduction between the voltage node VBO and the output terminal Vout.

Figure 10:
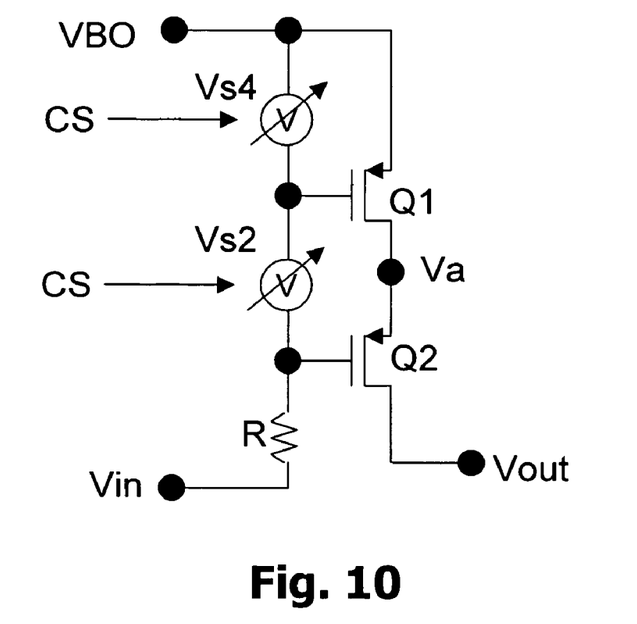

FIG. 10 shows another preferred embodiment of the present invention. In fact, the normal (life-time) voltage sustaining capability of, a transistor device is different from the short-term (instant) voltage sustaining capability of the same transistor device; the latter can be as high as twice the former. In this embodiment, the voltage source Vs1 is replaced by a variable voltage source Vs4, which is also subject to the control by the control signal CS (or by other means). In normal operation, the voltage value of the variable voltage source Vs4 is about equal to that of the voltage source Vs1; when the output terminal Vout is shorted to ground, the voltage value of the variable voltage source Vs4 can be increased to, e.g., twice that of the voltage source Vs1, and the variable voltage source Vs2 is also adjusted to about the same value. Thus, the gate to source voltages Vgs1 and Vgs2 of the transistors Q1 and Q2 become twice that of the transistors Q1 and Q2 in FIG. 9; in other words, the transistors Q1 and Q2 can be made of devices having lower specification of sustained voltage. For example, the specification of sustained voltage of the transistors Q1 and Q2 in FIG. 10 can be half of that of the transistors Q1 and Q2 in FIG. 9.

Figure 11:
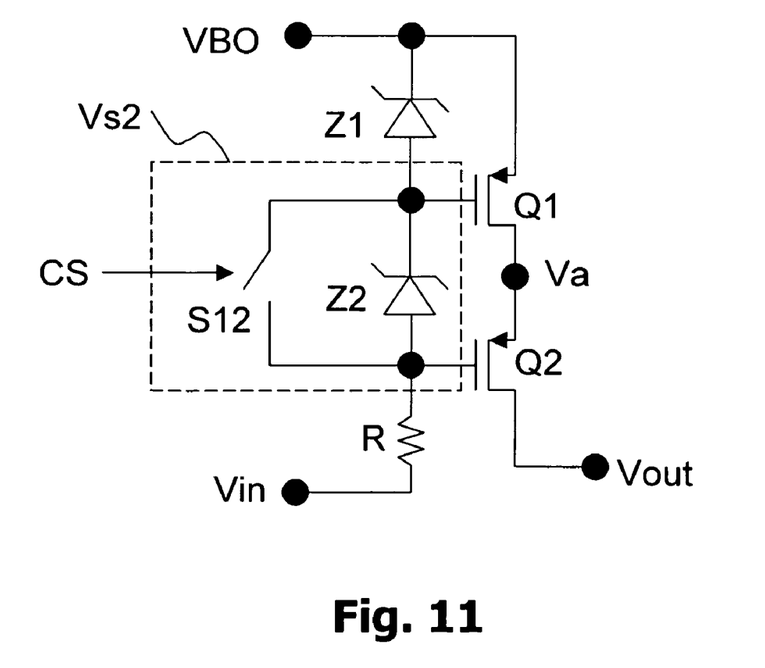
FIG. 11 is a schematic diagram showing a more specific hardware structure of the embodiment of FIG. 9.

As a more detailed embodiment of the circuit shown in FIG. 9, please refer to FIG. 11. In this embodiment, the voltage source Vs1 is a zener diode Z1; the variable voltage source Vs2 is a parallel circuit including a zener diode Z2 and a path having a switch thereon. The switch S12 is subject to the control by the control signal CS such that the switch S12 is ON in normal operation, but is turned OFF when the output terminal Vout is shorted to ground.

Figure 12:
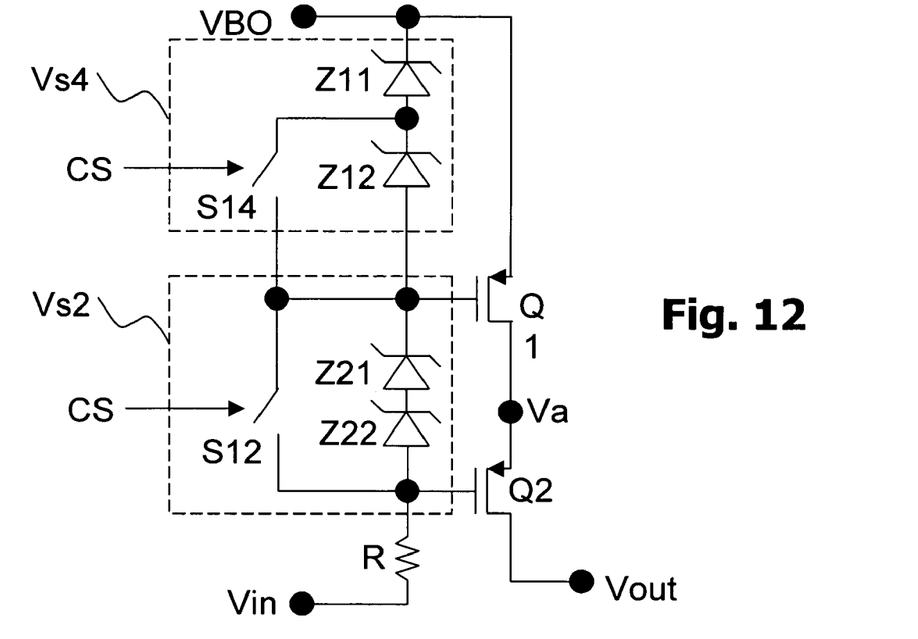
FIG. 12 is a schematic diagram showing a more specific hardware structure of the embodiment of FIG. 10.

FIG. 12 is a more detailed embodiment of the circuit shown in FIG. 10, in which the variable voltage source Vs4 includes two zener diodes Z11 and Z12, and a switch S14 connected in parallel; the variable voltage source Vs2 includes two zener diodes Z21 and Z22, and a switch S12 connected in parallel. In normal operation, both switches S12 and S14 are turned ON by the control signal CS; when the output terminal Vout is shorted to ground, both switches S12 and S14 are turned OFF by the control signal CS. In this manner, by means of the instant voltage sustaining capability of the transistors Q1 and Q2, the gate to source voltages of the two transistors are further expanded when the output terminal Vout is shorted to ground, which means that the transistors Q1 and Q2 can be made of devices having even lower specification of sustained voltage than that in the circuit of FIG. 9.

Figure 13:
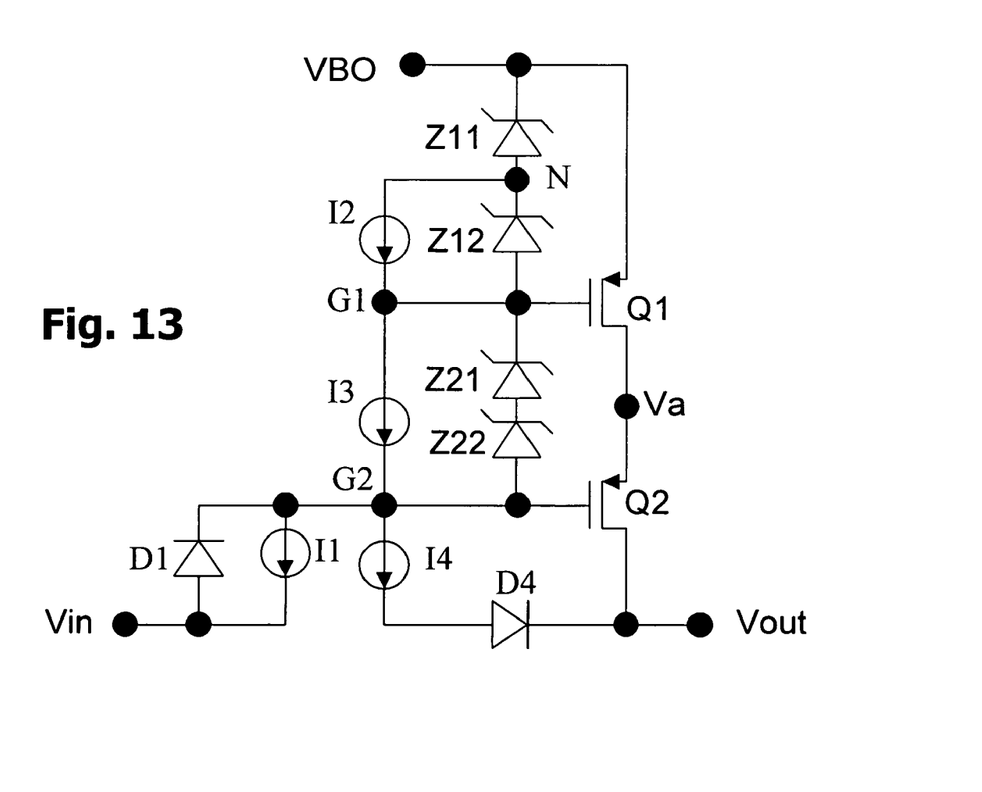
FIG. 13 is a schematic diagram showing another hardware structure of the embodiment of FIG. 10.

The control signal CS can be generated from the comparator shown in FIGS. 1 and 2, or by other means for example as follows. Referring to FIG. 13, four current sources I1-I4 are provided in this embodiment, wherein the current amounts of the current sources are in this order: I1<I2<I3<I4. In normal operation, because the voltage at the node VBO is about equal to the voltage at the output terminal Vout, I4 is not conductive; and because I1<I2<I3, the nodes N, G1 and G2 are shorted together, bypassing the zener diodes Z12, Z21 and Z22. The gate to source voltages of the transistors Q1 and Q2 are both equal to the breakdown voltage of the zener diode Z11, and are both turned ON.

On the other hand, at the initial instant period when the output terminal Vout is shorted to ground, the voltage at the node VBO is far greater than the voltage at the output terminal Vout, and thus I4 is conductive; and because I2<I3<I4, the voltage at the node G2 will be pulled down to a level where all zener diodes Z11, Z12, Z21 and Z22 breakdown, to create a current path from the node VBO through zener diodes Z11-Z12-Z21-Z22 to the node G2 to supply more current in addition to the current sources I2 and I3. Thus, the gate to source voltage Vgs1 of the transistor Q1 is about equal to the total voltage across the zener diodes Z11 and Z12, and the gate to source voltage Vgs2 of the transistor Q2 is about equal to the total voltage across the zener diodes Z21 and Z22, so that the transistors Q1 and Q2 share the voltage at the node VBO. Moreover, because the input voltage Vin is higher than the voltage at the output terminal Vout, there is a current path from the input terminal Vin to the output terminal Vout through diode D1—node G2—current source I4—diode D4, and the voltage at the node G2 is about equal to the input voltage Vin minus the voltage drop of a diode (i.e., Vin-0.7V). As the voltage at the node VBO decreases, when the voltage at the node Va is about equal to the voltage at the node G2, the transistor Q2 automatically turns OFF to cut off the primary current path from the node VBO to the output terminal Vout; as the voltage at the node VBO further decreases, the zener diode Z11 also shuts down, so that no current will flow from the node VBO to the output terminal Vout.

Figure 14:
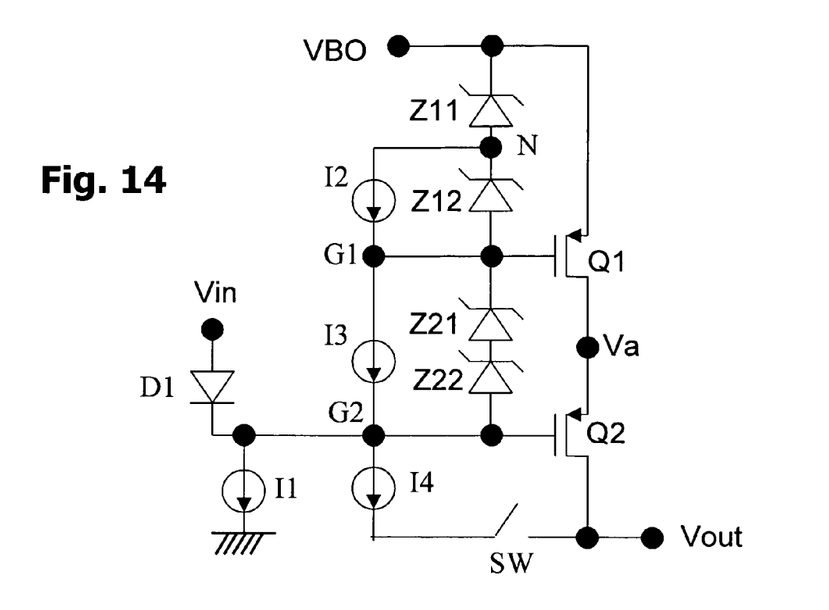
FIG. 14 is a schematic diagram showing an alternative of the embodiment of FIG. 13.

FIG. 14 is a variation of FIG. 13, in which the current source I1 is connected to ground instead of Vin, and a switch SW replaces for the diode D4 so that when the output terminal Vout is shorted to ground, after the short circuit protection is achieved, the switch SW may be turned OFF when the voltage at the node VBO is even lower than a threshold, to cut off the current path from Vin to Vout through I4.

Figure 15A:
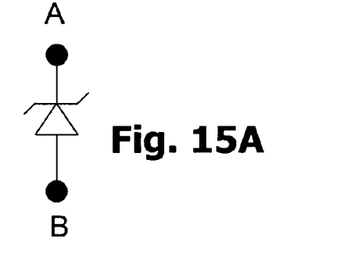
FIGS. 15A and 15B show alternatives to the zener diode.
Figure 15B:
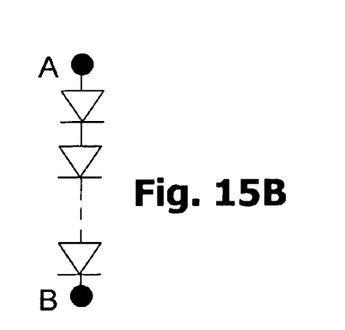
Figures 16A, 16B, 16C:
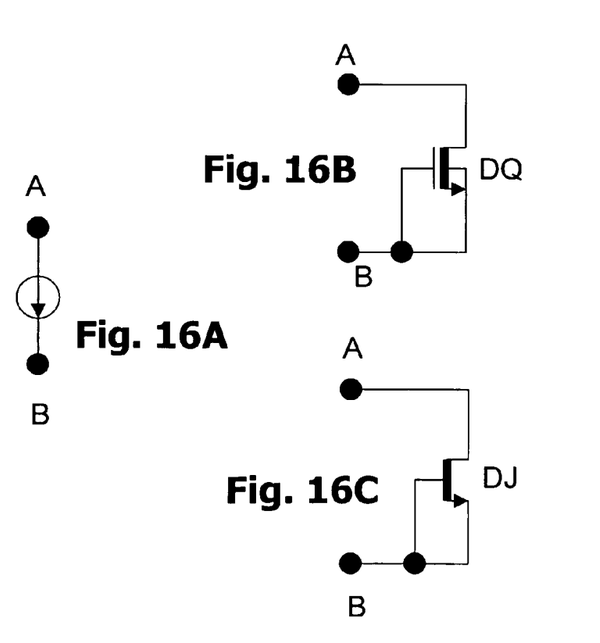
FIGS. 16A-16D show alternatives to the current source.
Figure 16D:
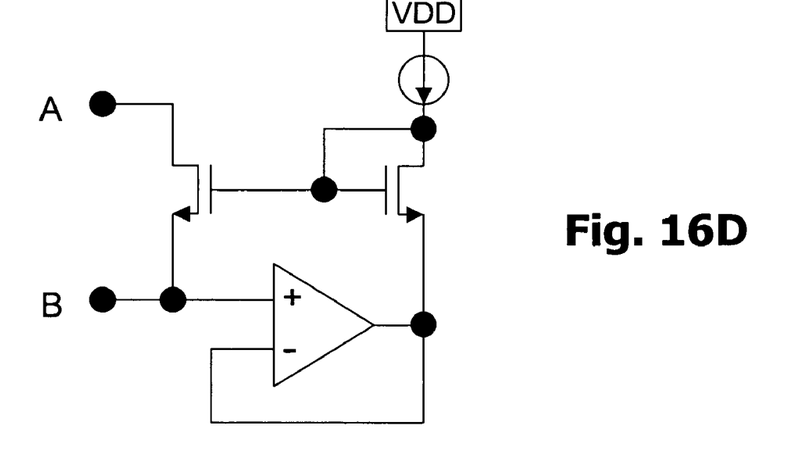

The devices employed in the embodiments of FIGS. 13 and 14 can be replaced in a way similar to those shown in FIGS. 3-7. For example, the current source I4 may be replaced by a resistor. As another example, the zener diode (FIG. 15A) may be replaced by the circuit shown in FIG. 15B. As a further example, the current source (FIG. 16A) may be replaced by the circuits shown in FIGS. 16B-16D (wherein DQ is a depletion mode MOS field effect transistor, and DJ is a depletion mode junction field effect transistor).

Figure 17:
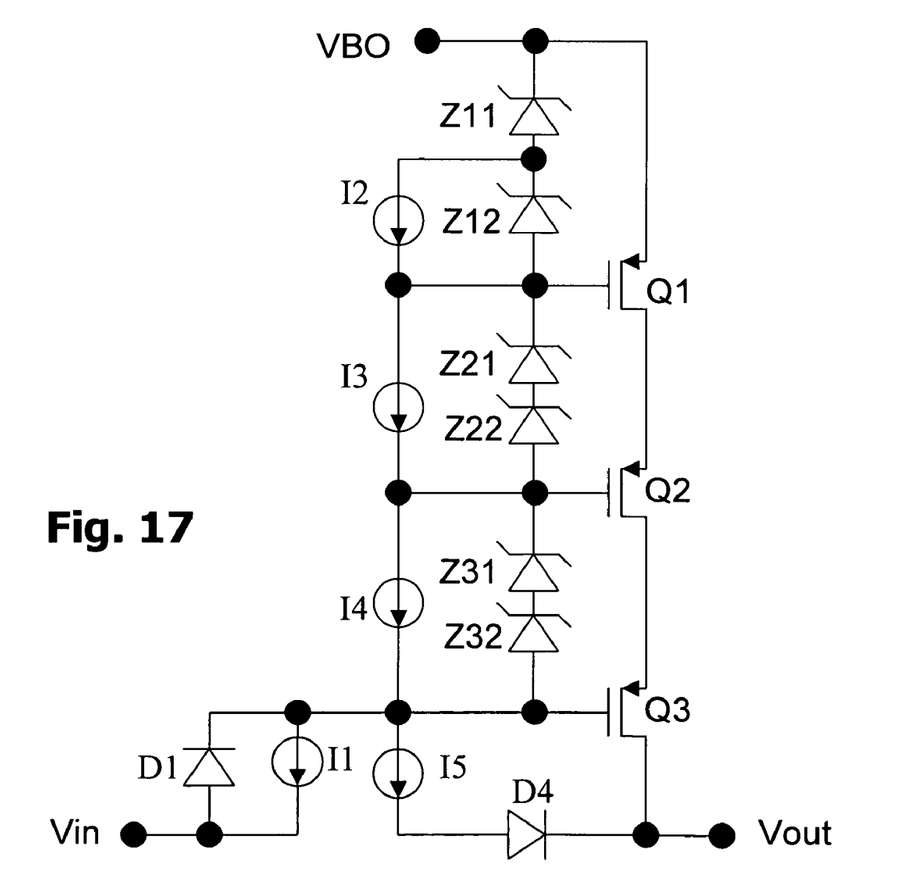
FIG. 17 is a schematic diagram showing another embodiment of the present invention.

The number of the transistors to share the voltage difference between the voltage at the node VBO and the voltage at the terminal Vout is not limited to two. More number of transistors can be used, as shown in FIG. 17.

The present invention has been described in considerable detail with reference to certain preferred embodiments thereof. However, these embodiments are for illustrative purpose and not for limiting the scope of the present invention. Other variations and modifications are possible. For example, the boost converter where the present invention is applied to is not limited to the switching converter as shown in FIGS. 1 and 2. Moreover, although a boost converter does require a short circuit protection circuit, the short circuit protection circuit and method according to the present invention can be used in circuits other than the boost converter. The present invention can be applied to protect any abnormal condition that results in a sudden increase of voltage difference between two nodes of a circuit, not necessarily limited to short-circuiting of one of the nodes. In the embodiments above, the VOUT short circuit condition results in a sudden increase of voltage difference between VBO and VOUT. In other cases of different applications, the VBO node may be coupled to an abnormal energy source (such as being hot plugged) and the voltage at the node VBO suddenly increases to an overrated level, and similarly, it results in a sudden increase of voltage difference between VBO and VOUT. This is recognized as the "over voltage" condition, and it can also be protected by this invention.

In view of the foregoing, it is intended that the present invention cover all such modifications and variations, which should be interpreted to fall within the scope of the following claims and their equivalents.

What is claimed is:

1. A protection circuit, comprising:
   a first input terminal;
   a second input terminal;
   an output terminal;
   at least two transistors including a first and a second transistors connected in series with each other and electrically connected between the first input terminal and the output terminal; and
   a variable voltage source circuit electrically connected with the first input terminal, the second input terminal, the output terminal, and the gates of the first and second transistors, the variable voltage source circuit being operative such that:
   when a voltage at the first input terminal is higher than a voltage at the second input terminal, and a voltage at the output terminal is higher than the voltage at the second input terminal, the first and second transistors are both ON and the gates of the first and second transistors are substantially at equal voltage level;
   when the voltage at the first input terminal is higher than a voltage at the second input terminal, and the voltage at the output terminal is lower than the voltage at the second input terminal, the sates of the first and second transistors are substantially at unequal voltage levels and each of the first and second transistors shares a substantial portion of the voltage difference between the first input terminal and the output terminal; and
   when the voltage at the first input terminal is equal to or smaller than the voltage at the second input terminal, at least one of the first and second transistors is OFF to disconnect the conduction between the first input terminal and the output terminal.

2. The protection circuit of claim 1, wherein the variable voltage source circuit includes three voltage sources: a first voltage source electrically connected between the first input terminal and the gate of the first transistor, a second voltage source electrically connected between the gate of the first transistor and the gate of the second transistor, and a third voltage source electrically connected between the gate of the second transistor and the second input terminal.

3. The protection circuit of claim 2, wherein the voltage difference between the first input terminal and the output terminal suddenly increases because the output terminal is shorted to ground.

4. The protection circuit of claim 2, wherein the second voltage source is a variable voltage source which controls the gate voltages of the first transistor and the second transistor such that they are equal or unequal.

5. The protection circuit of claim 4, wherein when the output terminal is shorted to ground, the voltage across the second voltage source is not zero, and when the output terminal is operating normally, the voltage across the second voltage source is zero.

6. The protection circuit of claim 4, wherein the second voltage source includes a voltage source device and a path connected in parallel, and when the output terminal is shorted to ground, the path is conducted.

7. The protection circuit of claim 2, wherein the first voltage source is a variable voltage source to increase the gate to source voltage of the first transistor when the voltage difference between the first input terminal and the output terminal suddenly increases.

8. The protection circuit of claim 7, wherein when the output terminal is shorted to ground, the voltage across the first voltage source is larger than the voltage across the first voltage source when the output terminal is operating normally.

9. The protection circuit of claim 1, wherein the second input terminal is an input to a boost converter circuit, and the first input terminal is an output of the boost converter circuit.

10. A protection circuit, comprising:
a first input terminal;
a second input terminal;
an output terminal;
at least two transistors including a first and a second transistors connected in series with each other and electrically connected between the first input terminal and the output terminal;
a first variable voltage source circuit including a first and a second voltage source devices connected in series with each other, and a first current source connected in parallel with the second voltage source device, the first voltage source circuit being electrically connected between the first input terminal and the gate of the first transistor; and
a second variable voltage source circuit including a third and a fourth voltage source devices connected in series with each other, and a second current source connected in parallel with the third and fourth voltage source devices, the second variable voltage source circuit being electrically connected between the gates of the first and the second transistors,
wherein the first variable voltage source circuit and the second variable voltage source circuit are operative such that:
when a voltage at the first input terminal is higher than a voltage at the second input terminal, and a voltage at the output terminal is higher than the voltage at the second input terminal, the first and second transistors are both ON and the gates of the first and second transistors are substantially at equal voltage level;
when the voltage at the first input terminal is higher than a voltage at the second input terminal, and the voltage at the output terminal is lower than the voltage at the second input terminal the sates of the first and second transistors are substantially at unequal voltage levels and each of the first and second transistors shares a substantial portion of the voltage difference between the first input terminal and the output terminal; and
when the voltage at the first input terminal is equal to or smaller than the voltage at the second input terminal, at least one of the first and second transistors is OFF to disconnect the conduction between the first input terminal and the output terminal.

11. The protection circuit of claim 10, further comprising a fifth voltage source device electrically connected between the gate of the second transistor and the output terminal.

12. The protection circuit of claim 10, further comprising a circuit supplying voltage from the second input terminal to the gate of the second transistor when the voltage difference between the first input terminal and the output terminal suddenly increases, to cut off the conduction between the first input terminal and the output terminal.

13. The protection circuit of claim 10, wherein each of the voltage source devices is selected from the group consisting of: resistor, zener diode, current source, depletion transistor, depletion junction transistor, a circuit providing a voltage source, and a combination of two or more of the above devices.

14. A protection method, comprising the steps of:
(A) providing at least two transistors including a first and a second transistors connected in series with each other and electrically connected between an input terminal and an output terminal;
(B) when the output terminal is operating normally, controlling the voltages at the gates of the first and second transistors to be substantially equal with each other;
(C) when the voltage difference between the first input terminal and the output terminal suddenly increases, controlling the first and second transistors such that the voltages at the gates of the first and second transistors are different and each of the first and second transistors share shares a substantial portion of the voltage difference between the input terminal and the output terminal; and
(D) after the voltage difference between the first input terminal and the output terminal suddenly increases, cutting off the conduction between the input terminal and the output terminal by decreasing the voltage level at the input terminal.

15. The method of claim 14, wherein the step (C) includes: providing a variable voltage source between the gates of the first and second transistors, the variable voltage controlling the gate voltages of the first transistor and the second transistor such that they are equal or unequal.

16. The method of claim 14, wherein the step (C) further includes: (C1) causing the gate to source voltages of the first and second transistors to be larger than what they are when the output terminal is operating normally.

17. The method of claim 16, wherein the step (C1) includes: providing a variable voltage source between the input terminal and the gate of the first transistor.

* * * * *